United States Patent [19]
Blitz

[11] 4,013,885
[45] Mar. 22, 1977

[54] SOLAR ENERGY SUN TRACKER

[75] Inventor: Daniel Blitz, Boston, Mass.

[73] Assignee: Sanders Associates, Inc., Nashua, N.H.

[22] Filed: Jan. 8, 1976

[21] Appl. No.: 647,535

[52] U.S. Cl. .............................. 250/203 R; 126/270
[51] Int. Cl.² .............................................. G01J 1/20
[58] Field of Search .......... 250/203, 201, 202, 216, 250/234, 235, 236; 126/270, 271

[56] References Cited

UNITED STATES PATENTS

| | | | |
|---|---|---|---|
| 3,603,686 | 9/1971 | Paine .............................. | 250/203 R |
| 3,696,248 | 10/1972 | Cunningham et al. ......... | 250/203 R |
| 3,924,604 | 12/1975 | Anderson ......................... | 126/270 |
| 3,952,208 | 4/1976 | Desvignes et al. .............. | 250/203 R |

*Primary Examiner*—David C. Nelms
*Attorney, Agent, or Firm*—Louis Etlinger; Robert K. Tendler

[57] ABSTRACT

A sun tracking servo system is disclosed in which individual mirrors are tilted to redirect incoming sunlight towards a solar energy receiver. Mirror steering is accomplished by providing the mirror with a central aperture and/or lens to form images of both the sun and receiver behind the mirror and by lining up the IR image of the solar receiver with a reflection of the image of the sun from a reflecting back surface of the mirror by rotating the mirror about its central aperture. Image alignment is detected by a sensor behind the mirror which is in line with the aperture and the receiver. Each mirror is provided with a projection screen type imaging surface affixed to and spaced from the back side of the main mirror onto which an image of the sun is formed. In one embodiment a limited aperture reflector is positioned on the back of the mirror to reflect the sun's image from the projection screen to a stationary combined solar image and receiver image detector only when the mirror is pointed in the proper direction. In another embodiment, the solar/receiver image detector is moved to compensate for motion of the solar energy receiver such as that caused by sway of its supporting tower or shifting of the mirror gimbal supporting structure, thereby keeping the solar/receiver image detector centered along the line between the aperture of the mirror and the instantaneous position of the solar energy receiver.

25 Claims, 8 Drawing Figures

SOLAR ENERGY SUN TRACKER

FIELD OF INVENTION

This invention relates to solar energy and more particularly to servo systems for use with individually steerable mirrors which redirect sunlight towards a solar energy receiver.

BACKGROUND OF THE INVENTION

One of the problems surrounding the utilization of solar energy on the kilowatt and megawatt level is the problem of concentrating this much energy onto a solar energy receiver. One of the ways of concentrating this much solar energy involves the use of as many as 10,000 individually steerable mirrors in a so-called mirror field covering many acres in which the mirrors redirect sunlight to a solar energy receiver which may be at the top of a mast or tower in the middle of the field, or at any other suitable location such as the side of a hill. Each mirror must take on a different orientation to redirect that portion of the solar energy falling on it to the solar energy receiver. It will be appreciated that even a one degree angular misorientation of an individual mirror may cause the sunlight reflected by it to miss the solar receiver entirely. While it is possible to individually program the driving system for each mirror to correct for the sun's apparent motion, individual programming suffers not only from the complexity of the apparatus needed at each individual mirror but also suffers from its inability to take into account pointing errors due to transient effects such as for instance wind loading, temperature gradients, sway of the power tower, turbulence effects and even ground movement. While it is at least theoretically possible to measure and program in these factors, there is no assurance that the physical systems involved will operate sufficiently in accordance with theory to permit accurate aiming or pointing of the individually steerable mirrors. Moreover, with individual programming it is necessary to continuously or at least on a periodic basis align and calibrate the driving systems for each individual mirror. Even if this is done on a weekly basis, the cost is significant and significant amounts of solar energy may be lost. It is also recognized that individual programing for each of the mirrors in the mirror field need not be done at an individual mirror but may rather be done by a central processor. However, the central processing still suffers from the same difficulties mentioned hereinbefore.

It has also been suggested that a sensor be mounted on an external servo-driven boom at the center of each mirror, with boom alignment the prerequisite for mirror alignment. However each boom presents a substantial lever arm and therefore requires heavy support structure to maintain boom position and to prevent mirror flexure during high winds. Moreover, the boom is external, exposed to the outdoor environment and is fragile and costly.

This invention solves the above problems by placing the entire mechanism behind the mirror and providing each of the mirrors with a central aperture and/or lens to form images of the sun and receiver on surfaces behind the mirror and by aligning the infrared (IR) image of the solar receiver with a reflection of the image of the sun by rotating the mirror about its central aperture. In one embodiment, each mirror is provided with a projection screen type imaging surface in the form of a light weight non-specular light dispersive semi-transparent member on its back side, onto which an image of the sun is formed. In this embodiment this screen takes on the form of a hemisphere with its periphery attached to the back of the main mirror for exceptionally stable support and ease of construction. In this embodiment, a limited aperture reflector is positioned on the back of the main mirror to reflect the sun's image from the projection screen to a combined solar image and receiver image detector, only when the main mirror is pointed in the proper direction. When the main mirror is not pointed in the proper direction the reflected solar image is directed away from the detector and this condition is sensed. The solar/receiver image detector is positioned adjacent the projection screen along the line from the solar energy receiver on the tower through the mirror aperture. The mirror is positioned such that the image of the sun on the projection screen, when reflected by the limited aperture reflector is coincident with and/or concentric with the infrared image of the solar energy receiver at the solar/receiver image detector. Off-centering of the solar image with respect to the IR receiver image is detected at the detector and the gimbal mounting for the mirror is driven so as to bring the reflected image of the sun into coincidence with the image of the solar energy receiver.

In addition to the stability of the subject system against wind loading and the automatic mirror alignment without computer control, it is an important part of this invention that rather than utilizing a visual representation of the solar energy receiver, infrared energy radiated by the receiver is utilized in the mirror alignment process. It is also a important feature of this invention that rather than providing the detector with a lens, on one embodiment this focusing means is completely eliminated by virtue of the limited aperture reflector on the back of the mirror and in another embodiment by the use of a retro-reflecting coating on the solar image surface.

In one embodiment, the solar/receiver image detector is moved to compensate for sway of the solar energy receiver on the tower, thereby keeping the solar/receiver image detector positioned along the line from the instantaneous position of the solar energy receiver through the aperture of the mirror. It will be appreciated that with towers 300 feet tall or more, the sway of the receiver at the top of the tower may be as great as several feet due to high wind loading. With sways of this magnitude, the majority of the redirected solar radiation can miss the solar receiver which may only be one foot in diameter. The subject system corrects for the sway of the power tower by repositioning the solar/receiver image detector, and this is accomplished without the necessity of sensing the sway of the power tower at the tower itself. In one embodiment the movement or repositioning of the detector is accomplished by an XY servo drive system.

In another embodiment, a self-aligning mechanism for the detectors contemplates mounting the entire detector system on an array of bimetallic elements. These bimetallic elements cause the entire detector to sway in a direction opposite to the sway of the solar energy receiver, therefore in the same direction as its image, due to differential heating of the elements, thereby keeping the detectors aligned with the mirror aperture and receiver. Thus no complicated feedback loop mechanisms are necessary in the repositioning of the detector assembly to accommodate tower sway.

In a still further embodiment, the reflector on the back side of the mirror need not be limited in aperture if a lens is provided in the path between the solar image surface and the solar/receiver image detector. In this embodiment, one of the things which distinguishes the subject system from the conventional emergency mirror flashing system is that infrared or heat sensors are utilized to track the position of the solar energy receiver. Since the solar energy receiver is typically operated at a temperature between 1500° F and 2500° F, there is sufficient infrared radiation to be detected at large distances from the solar receiver. While this detector also simultaneously detects the position of the sun relative to the mirror it does this in the visible region of the electromagnetic spectrum. On the other hand infrared electromagnetic energy from the solar energy receiver defines the other parameter for proper mirror pointing. The advantage of this system over the detection system which do not differentiate between the images is that coatings can be applied, for instance to the reflector on the back of the mirror or to the projection screen, to provide a pass band for light in the visible region of the electromagnetic spectrum while rejecting infrared radiation. This permits discrimination between the image of the sun and the image of the solar receiver. Likewise the various portions of the detector can be provided with color selective coatings, thereby to enhance the discrimination between the two images.

Discrimination between the two images may be important when, for instance, the infrared radiation from the solar receiver is sharply focused, while radiation representing the sun's image covers a much broader area. This is the case with the use of the aforementioned limited aperture reflector on the back of the main mirror which spreads out the sun's image, and permits the use of concentrically mounted detectors. In this case the infrared portion of the detector is centrally located and is surrounded by conventional photocells for detecting the less concentrated sun's image. In both cases quadrant type detectors involving the use of thermal-sensitive and photo-sensitive elements respectively may be utilized.

As to the positioning of the mirror itself, this is accomplished by the use of motors which drive it around 'X' and 'Y' axes, in accordance with the output of differential amplifiers having inputs connected to opposing quadrant members of the reflected solar image detector.

It is therefore an object of this invention to provide an improved method and apparatus for automatically steering individual mirrors in a mirror field, in which there are no external parts in front of the mirrors, where these parts are protected from exposure, and wherein the system is stable, reliable, inexpensive to make and maintain, rugged and posses inherent alignment precision.

It is another object of this invention to provide a unique solar mirror drive system for mirrors in a mirror field in which no parts supported by the mirror present any appreciable lever arm, thereby contributing to the mechanical stability of the system.

It is still a further object of this invention to provide a mirror pointing system in which images of the sun and the receiver are produced in back of the mirror with an imaging surface in the form of a semi-transparent projection screen located in back of the mirror onto which the sun is imaged.

It is another object of this invention to provide a mirror pointing system in which movement of the distant object onto which solar energy is to be directed is accommodated by movement of detection apparatus in back of the mirror.

It is a still further object of this invention to provide a mirror pointing system in which two different types of radiation are utilized in the formation of concentric images for mirror alignment detection.

These and other objects of the inventions will be better understood where in connection the following specification in conjunction with the following drawings wherein

DETAILED DESCRIPTION

Figure 1:
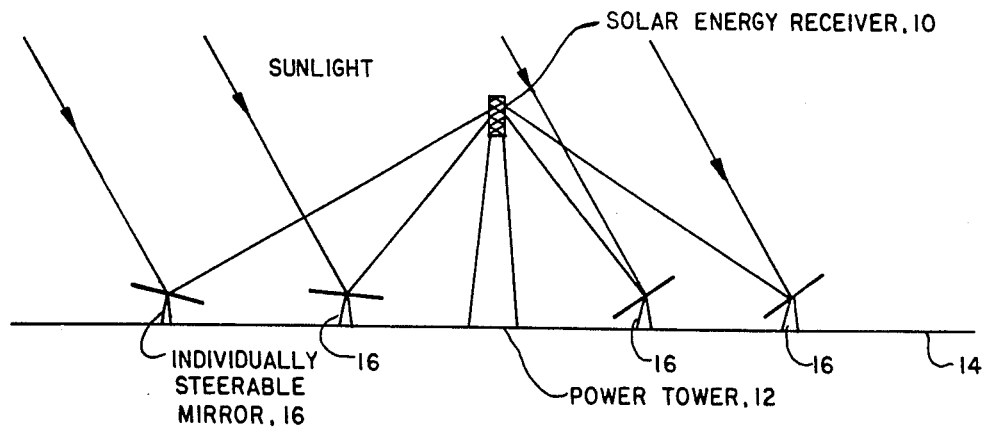
FIG. 1 is a diagrammatic representation of a solar energy receiver mounted on top of a power tower and with individually steerable mirrors located around the base of the tower utilized to redirect sunlight towards the solar energy receiver.

Referring now to FIG. 1, a solar energy receiver 10 is mounted on top of a power tower 12 which may extend as much as 300 feet above the ground 14. About and around the tower are located a number of individually steerable mirrors 16 which are tilted so as to redirect sunlight towards the solar energy receiver. As can be seen, each of the mirrors is given different orientation so as to direct that portion of sunlight impinging on it towards the solar energy receiver. As the sun moves across the sky these mirrors must be continually repositioned and the accuracy of the mirror pointing must in certain instances be within a milliradian in order that the redirected sunlight impinge on the solar energy receiver. While, as mentioned hereinbefore, it is possible to utilize computer driven mirrors using precision shaft encoders, to track the sun's position, they do not readily correct for shifts in mirror angle caused by such transient effects as wind loading, and differential thermal expansions in the tilting mechanism, or variable atmospheric refraction in the path of the incoming solar energy which can cause significant pointing errors. What is therefore necessary is a system which automatically compensates for these errors by sensing the direction in which the sun's energy is being reflected from the mirrors, which sensing takes place at the mirror, and which automatically keeps the mirrors tilted in the proper orientation responsive to the sensed sun's reflection so that little, if any, of the incident solar radiation is lost. In addition, it may be necessary to compensate for the sway of the solar energy receiver and the tower due to wind loading and shifts in the angle of the mirror support resulting from earth movements caused by frost, moisture, etc., so as to keep all of the incident solar energy directed to the solar receiver.

Figure 2:
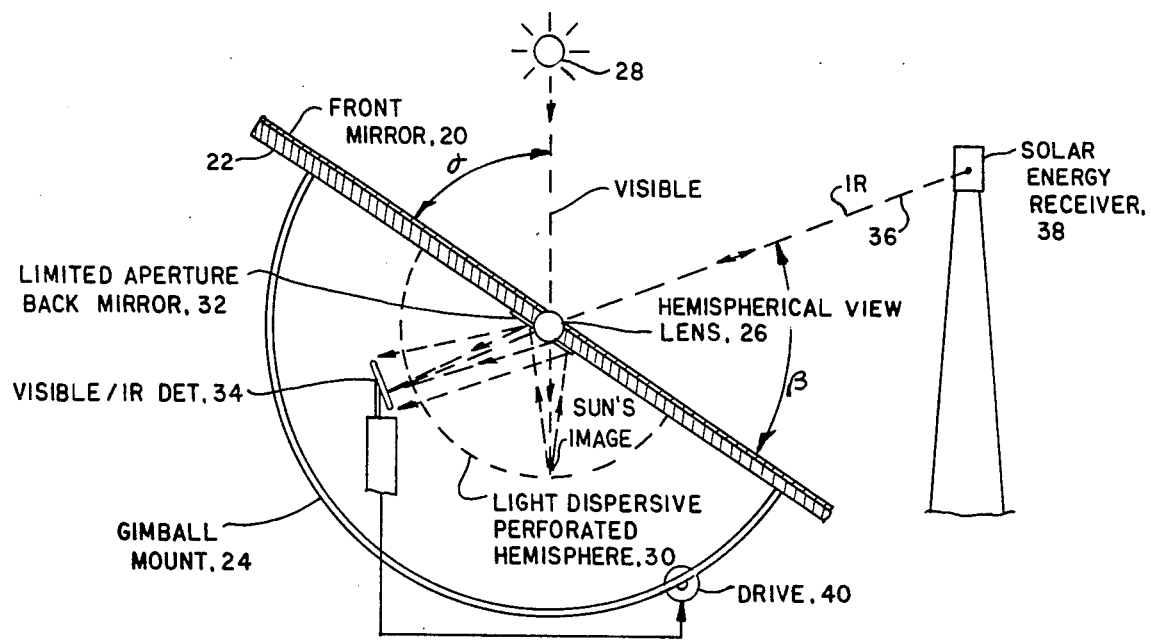
FIG. 2 is a diagrammatic representation of one embodiment of the subject invention in which a tiltable mirror is provided with a centrally located aperture and lens, a hemispheric semi-transparent imaging surface attached to the back of the mirror, a limited aperture back mirror and a detector located on the line from the solar energy receiver which passes through the central aperture of the mirror.

One automatic system which accomplishes this is illustrated in FIG. 2. In this Figure a large front mirror 20 is supported on a support 22 which is gimbal mounted, as illustrated by reference character 24 so that the mirror may be rotated or tilted about its center. In this embodiment, the center of the mirror contains an aperture at which in one embodiment a hemispherical view lens 26 is located. One of the purposes of this lens is to form an image of the sun, here illustrated by reference character 28, onto a hemispherical imaging surface 30 which is attached to the back side of support 22. This imaging surface forms a projection screen and is perforated so that it is semi-transparent, partially transparent, or transparent at a large number of points. In one embodiment the imaging surface may be removed slightly from the image plane of the lens so that the image of the sun is spread out or made larger. Moreover, only a portion of a hemisphere need be utilized if the detector to be described hereinafter is to be positioned between the projection screen and the front mirror.

In one embodiment the imaging surface of this screen is light dispersive, while in another embodiment this surface may be made of tiny corner, spherical or other narrow-beam retro-reflectors. As will be described later, the retro-reflector embodiment may be used when an extensive back mirror reflector is utilized. However, in this embodiment an image of the sun is formed on a light dispersive surface and this image is reflected by a limited aperture back mirror 32 which is concentric with lens 26, to a solar/receiver image detector 34 located adjacent hemisphere 30. As will be described, this detector, which contains a central IR detector surrounded by a visible radiation detector, is centered on a line 36 which passes from a solar energy receiver 38 through the center of the aperture in the front mirror. Alternatively, only a solar image detector need be utilized if tower sway or earth motion is not a problem.

The output of the detector 34 is utilized to actuate the gimbal drive generally indicated by reference character 40 to rotate the mirror about axes in the 'X' and 'Y' directions so that sunlight impinging on the surface of the front mirror is always reflected along line 36 toward the solar energy receiver.

Towards this end, the mirror must be tilted such that the angle between the sun and the mirror, here $\alpha$, is equal to the angle between the solar energy receiver and the mirror, here illustrated as $\beta$. When this has been accomplished, the image of the sun, as reflected by the limited aperture back mirror, will be concentric about line 36 and also concentric to the infrared image of the solar energy receiver at detector 34. As the sun moves across the sky, its image on image surface 30 will shift, thereby causing a shift in the position of the reflected image so that it is no longer concentric with either line 36 or the smaller infrared image of the solar energy receiver. Since the back mirror has a limited aperture, when the image of the sun has shifted far enough, none of the light from the image will be incident on the detector. Before this happens there will be less incident light on one side of the detector than on a diametrically opposite side, and the servo system, to be described hereinafter, will generate signals which are used to gimbal the mirror to the point where equal light is detected on diametrically opposite sides of the detector. Alternatively, the operation is the same when retroreflectors are used on the solar imaging surface in conjunction with back reflectors which are not aperture-limited.

Figure 6:
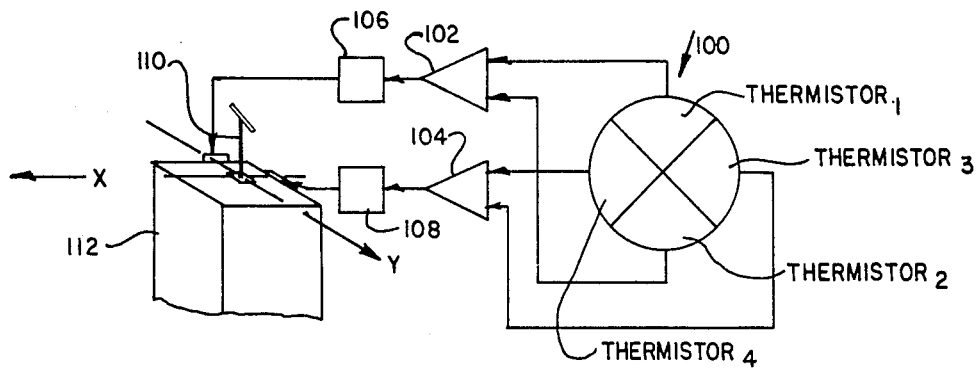
FIG. 6 is a diagrammatic and schematic illustration of one method of repositioning the detector apparatus in response to receiver sway in which receiver sway is detected at the mirror location.

If tower sway or earth motion is a problem, the detector may be provided with a centrally located IR image detector surrounded by a quadrant type solar image detector as shown in FIG. 6. As will be described, the IR detector is used to sense the alignment of the solar image detector with the solar energy receiver and the mirror aperture and to reposition the solar image detector to accommodate for tower sway or earth motion. The concentric detector arrangement is made possible because in general the solar image at the detector can be made larger than the receiver image, as described hereinbefore by offsetting the image surface from the image plane of the lens to spread out the sun's image.

The concentric detector arrangement may, however, be replaced by overlapping detectors if the image of the sun at the detector is no larger than the image of the solar energy receiver at the detector. Differentiation between the two images may be accomplished by color coating the limited aperture back mirror or imaging screen and providing the solar image detector with a filter having a pass band at this color. This further differentiates the image of the sun in the visible region of the electromagnetic spectrum from the infrared image of the solar energy receiver.

Figure 3:
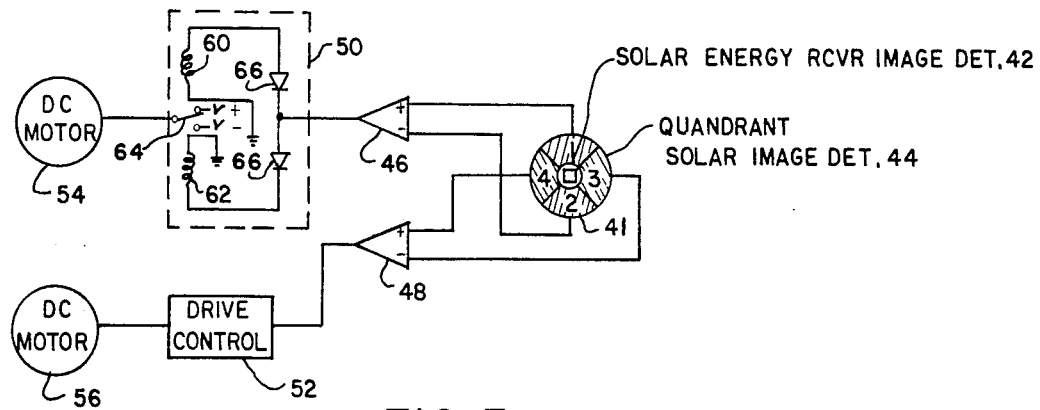
FIG. 3 is a schematic diagram of a concentric detector arrangement for use in combination with the apparatus of FIG. 2 in which a quadrant detector is utilized in combination with differential amplifiers to actuate gimbal drive apparatus.

Referring now to FIG. 3, the concentric detector system is diagrammatically illustrated at reference character 41. Here a quadrant type solar energy receiver detector 42 is located concentric with a quadrant type solar image detector 44 which has diametrically opposite photocell segments 1, 2 and 3, 4. With respect to the solar image detector, outputs from diametrically opposite segments are coupled to the differential inputs of differential amplifiers 46 and 48 respectively. The outputs of these amplifiers are coupled to drive control units 50 and 52 respectively which actuate respectively mirror Y axis DC motor 54 and mirror X axis DC motor 56 responsive to the sign of the output of the associated differential amplifier. The orthogonal orientation of segments 1, 2 and 3, 4 are the same as the mirror 'Y' axis, 'X' axis drive orientation.

Drive control units 50 and 52 in one embodiment each comprise relay coil 60 and 62, in between which is positioned a relay-actuated switch 64 which connects the DC motor either to a positive voltage or a negative voltage depending on which of the two relay coils is energized. Energization of a relay coil depends upon the sign of the output of the associated differential amplifier, with diodes 66 and 68 acting as the sense elements to sense the sign of the output of the differential amplifier. If a positive voltage appears at the output of the differential amplifier then relay coil 62 will be actuated. This in turn respectively couples the motor to a negative DC voltage or a positive DC voltage thereby to control the associated DC motor direction. When the output voltage from a differential amplifier is zero indicating proper mirror pointing, switch 64 is centered and no power is delivered to the associated DC motor. Obviously, more complicated drive control circuitry is possible to prevent hunting.

Figure 4:
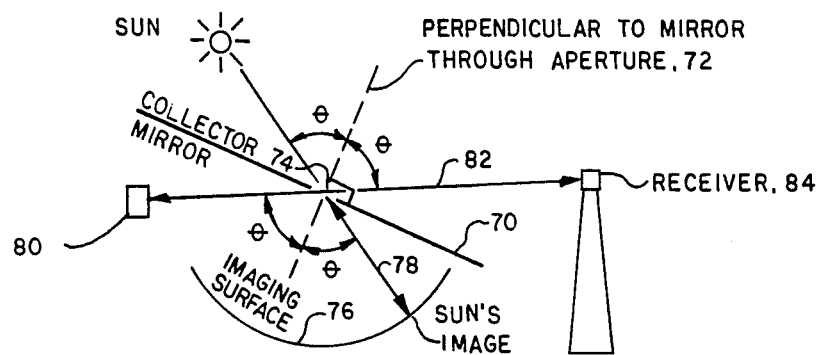
FIG. 4 is a diagrammatic representation illustrating the geometric relationships utilized in the subject invention.

Referring now to FIG. 4, the geometric relationships which define the appropriate angular orientation of the mirror are illustrated by reference character 70 and a normal to this mirror is illustrated by dotted line 72. A ray from the sun through the central aperture 74 in mirror 70 impinges on an imaging surface 76. In this embodiment the aperture does not carry a focusing lens. This line or ray is illustrated by reference character 78. The solar image detector is illustrated at 80 to be located on a line 82 running from the solar receiver 84 through aperture 74. Proper alignment of mirror 70 occurs when the angle between line 78 and normal 72 in front of the mirror equals the angle between this normal and line 82. By equality of angles, this is also the condition when the angle between line 78 and the normal behind the mirror is equal to the angle between line 82 and this normal. When this occurs the image of the sun from the image surface reflected by a back reflecting surface of the mirror is concentric with line 82 as sensed by the solar image detector 80, or put another way, the sun's image and the receiver image are coincident with or concentric to line 82.

Figure 5:
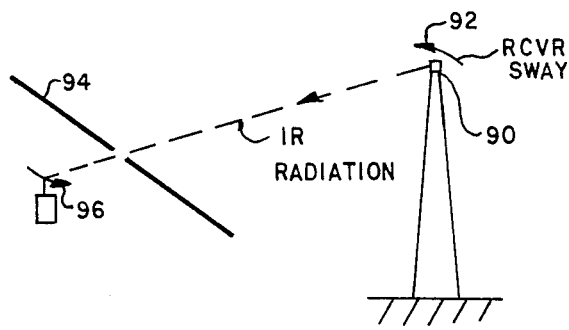
FIG. 5 is a diagrammatic representation illustrating the effect of solar receiver sway on the position of the detector apparatus.

Referring now to FIG. 5, the effect of receivers sway is illustrated. In this figure, receiver 90 may sway in the direction of arrow 92 which causes the image of the receiver in back of mirror 94 to sway in an opposite direction as illustrated by arrow 96. In order to maintain the detector apparatus located on the line between the receiver and the aperture in the mirror, it is necessary to reposition the detecting apparatus.

Referring now to FIG. 6, one method of assuring the appropriate alignment includes a solar receiver image detector thermistor array 100 in quadrant form, with diametrically opposed elements having outputs connected to corresponding differential amplifiers. Here thermistors 1 and 2 are connected to differential amplifier 102 and thermistors 3 and 4 are connected to a differential amplifier 104. These amplifiers are connected to drive control circuits 106 and 108 respectively which in turn control the position of solar image detection apparatus 110 mounted on an orthogonal drive system 112 of conventional design.

In operation, the mirror aperture is aligned such that the IR image of the receiver falls equally on all segments of the thermistor array and the outputs of the differential amplifiers are zero. If there is tower sway, the image of the receiver shifts on the thermistor array and causes differential heating and thus a difference in the outputs of diametrically opposed thermistors. This results in a non-zero output from a corresponding differential amplifier.

The signs of the outputs from the differential amplifiers are sensed in a conventional manner and the orthogonal drive unit is actuated so as to bring the position of the detection apparatus to a point where the outputs of both differential amplifiers is zero. Since the thermistor array carries the solar image detector, detector 110, when the receiver image detector array is in the proper position with zero differential amplifier outputs, the solar image detector will be centered on the line from the instantaneous position of the receiver through the mirror aperture.

Figure 7A:
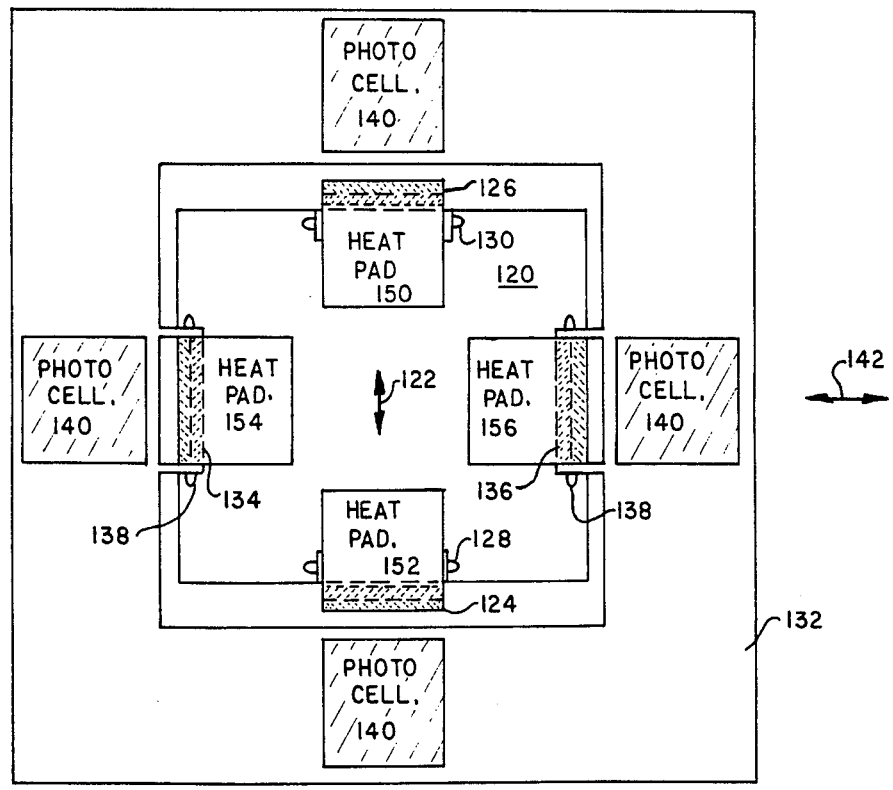
FIGS. 7A and 7B are diagrammatic illustrations of a bimetallic element detector support system which automatically compensates for receiver sway via differential heating of these elements.
Figure 7B:
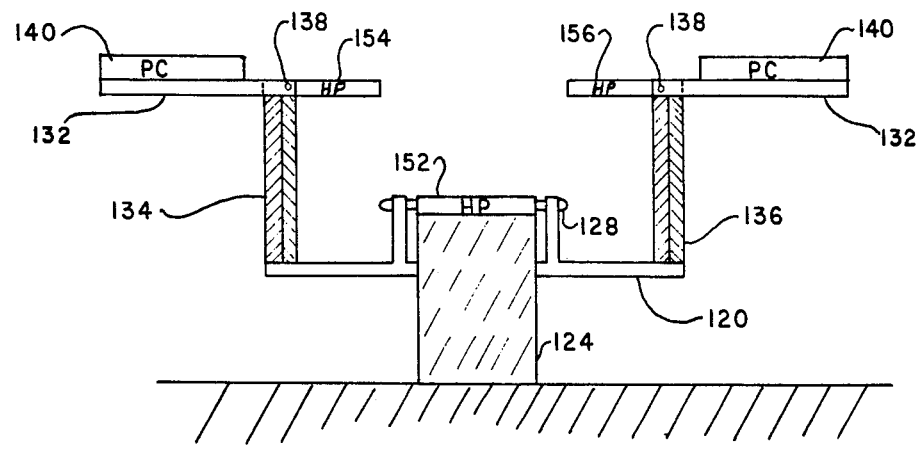

Referring now to FIGS. 7A and 7B, one type of system using a self-activated mechanism for automatically centering the detection apparatus on a line from the solar receiver which passes through the central aperture of the main reflecting mirror without external servos includes a central platform 120 which is capable of moving in the directions indicated by double ended arrow 122. This platform is supported by upright bimetallic elements 124 and 126 via pin-secured linkage assemblies 128 and 130 respectively.

An annular photocell mounting ring 132 is supported above platform 120 on bimetallic elements 134 and 136 which at one end are fixedly attached to platform 120 and at the other end are pivotably mounted to ring 132 by pin-secured linkage assemblies 138. Photocells 140 are mounted as illustrated.

The purpose of supporting ring 132 in this manner is that ring 132 may be moved in the directions indicated by double arrow 142 with respect to platform 120, and therefore can move in any combination of directions of arrows 122 and 142 in accordance with the movement of bimetallic elements 124, 126, 134 and 136 due to differential heating of the elements.

In order to detect the IR image of the solar receiver, radiant energy absorbing and heat conducting pads 150, 152, 154 and 156 are attached to the top of the bimetallic elements and these pads are arranged as illustrated with the pads being symmetric with respect to the center of the array. These pads sense the position of the infrared image of the solar receiver, with differential heating at opposing pads causing a sway of the associated bimetallic elements in the direction of the movement of the image of the solar receiver. In this way ring 132 is kept centered on a line from the instantaneous position of the solar receiver through the central aperture of the main mirror.

Each bimetallic support, as is conventional, contains two metallic members which have different coefficients of expansion. When these two elements are bonded together and heated they will bend, and in the present case, each of these bimetallic elements when heated bends outwardly thereby displacing the entire array in the direction of the movement of the image of the solar receiver. What is therefore accomplished is a self-activated automatic centering system which operates on the principal of differential heating as opposed to the aforementioned external servo recentering system.

Although a specific embodiment of the invention has been described in considerable detail for illustrative purposes, it must be realized that many modifications will occur to those skilled in the art. It is therefore desired that the protection afforded by Letters Patent be limited only by its true scope of the appended claims.

I claim:

1. Apparatus for use in the proper positioning of individually steerable mirrors spaced from a solar energy receiver, each mirror assembly comprising,
   a front reflector having an aperture,
   a support for said front reflector,
   means coupled to said support for adjusting the position of said front mirror about said aperture,
   an imaging surface behind said front reflector, a reflector located in back of said front reflector surrounding said aperture and concentric therewith, said back reflector lying in a plane parallel to said front reflector, and means located on a line from said solar receiver through said aperture for detecting the concentricity of the images of the sun in the visible region of the electromagnetic spectrum as reflected from said imaging surface by said back reflector with the IR image of said solar energy receiver and for driving said reflector adjusting means so as to maintain concentricity.

2. The apparatus of claim 1 wherein the reflector located in back of said front reflector has a limited aperture.

3. The apparatus of claim 2 wherein said adjusting means includes means for tilting said mirror in orthogonal directions such that said front reflector rotates about its central aperture.

4. The apparatus of claim 3 wherein said detecting means includes quadrant photocell means oriented with the same orthogonal directions and said tilting means.

5. The apparatus of claim 1 and further including a lens positioned in said aperture for focusing both the visible radiation from the sun and the IR radiation from said solar energy receiver.

6. The apparatus of claim 1 wherein said imaging surface includes a body having a shape of at least a portion of a hemisphere with the inside surface forming a projection screen.

7. The apparatus of claim 6 wherein said projection screen includes light dispersive material.

8. The apparatus of claim 6 wherein said projection screen includes small retro-reflectors.

9. The apparatus of claim 1 wherein said imaging surface includes a semi-transparent hemisphere and wherein said detection means is located outside of said hemispherical imaging surface.

10. The apparatus of claim 1 wherein said detection means includes both visible radiation detectors and infrared radiation detectors.

11. The apparatus of claim 1 and further including means for sensing the position of said solar energy receiver and for repositioning said detector means responsive to movement of said solar energy receiver such that said detector means always lies on the line from said solar energy receiver through said aperture.

12. The apparatus of claim 11 wherein said repositioning means includes bimetallic elements.

13. The apparatus of claim 1 wherein said imaging surface is attached to said support.

14. Apparatus for use in the proper positioning of individually steerable mirrors spaced from a solar energy receiver, each mirror assembly comprising:

a first reflector having an aperture,
a support for said first reflector,
means coupled to said support for adjusting the position of said first reflector,
an imaging surface behind said first reflector,
a limited aperture reflector located in back of said first reflector in a plane parallel to that of said first reflector, said limited aperture reflector being concentric to said aperture, and means located on a line from said solar energy receiver through said aperture for detecting the concentricity of the image of the sun as reflected from said imaging surface by said limited aperture reflector about said line and for driving said reflector adjusting means so as to maintain said concentricity.

15. The apparatus of claim 14 wherein said imaging surface is attached to said support.

16. Apparatus for use in the proper positioning of individually steerable mirrors spaced from a solar energy receiver comprising:

means behind a mirror for sensing the direction of the sun's reflection from said mirror relative to a predetermined direction along which said receiver is located, said sensing means including an imaging surface in the back of said mirror, and means on the back of said mirror for reflecting the image of the sun to a location in back of said mirror, and servo system means for automatically positioning said mirror responsive to the difference between said sensed direction and said predetermined direction such that radiation from the sun is constantly directed towards said receiver to maintain constant receiver illumination.

17. The apparatus of claim 16 wherein said mirror has an aperture and wherein said sensing means is located in back of said mirror on a line from said solar receiver through said aperture.

18. The apparatus of claim 16 wherein said sensing means includes means for detecting the concentricity of said reflected image with said line, and wherein said automatic positioning means includes means responsive to the lack of concentricity of said reflected image for repositioning said mirror so as to establish said concentricity.

19. The apparatus of claim 17 and further including a lens within said central aperture.

20. The apparatus of claim 19 wherein said imaging surface lies outside of the imaging plane of said lens thereby to spread the image of the sun at said imaging plane.

21. The apparatus of claim 18 wherein said concentricity detecting means responds only to light in the visibile portion of the electromagnetic spectrum and wherein said sensing means includes means for preventing infrared energy from impinging on said concentricity detecting means.

22. The apparatus of claim 21 wherein said preventing means includes a coating on said means on the back of said mirror for reflecting the image of the sun.

23. The apparatus of claim 16 and further including means at said mirror for sensing the position of said receiver and for repositioning said sensing means responsive to sensed movement of said receiver.

24. The apparatus of claim 23 wherein said receiver position sensing means includes means for detecting infrared radiation.

25. The apparatus of claim 23 wherein said sensing and repositioning means include bimetallic elements.

* * * * *